United States Patent [19]
Pfeiffer

[11] Patent Number: 5,415,433
[45] Date of Patent: May 16, 1995

[54] SEAT BELT ROLLER D-RING

[75] Inventor: Robert C. Pfeiffer, Troy, Mich.

[73] Assignee: AlliedSignal Inc., Morristown, N.J.

[21] Appl. No.: 100,018

[22] Filed: Jul. 30, 1993

[51] Int. Cl.⁶ ............................................. B60R 22/18
[52] U.S. Cl. ................................. 280/808; 297/483; 242/377
[58] Field of Search ............... 280/801 R, 801 A, 808; 297/468, 483; 242/107, 76; 24/639, 640, 163 R, 377, 615.2

[56] References Cited

U.S. PATENT DOCUMENTS

| | | | |
|---|---|---|---|
| 4,327,881 | 5/1982 | Föhl | 280/806 |
| 4,349,217 | 9/1982 | Föhl | 280/808 |
| 4,351,545 | 9/1982 | Cardew | 280/806 |
| 4,359,237 | 11/1982 | Gavagan et al. | 280/806 |
| 4,369,931 | 1/1983 | Föhl | 280/808 |
| 4,494,774 | 1/1985 | Föhl | 280/806 |
| 4,756,554 | 7/1988 | Tibbe | 280/806 |

FOREIGN PATENT DOCUMENTS

| | | | |
|---|---|---|---|
| 2820029 | 11/1973 | Germany | 280/808 |
| 2817741 | 10/1979 | Germany | 280/808 |
| 2828399 | 1/1980 | Germany | 280/808 |
| 52-13221 | 2/1977 | Japan | 280/808 |
| 2174888 | 11/1986 | United Kingdom | 280/808 |
| 1111907 | 9/1984 | U.S.S.R. | 280/808 |

Primary Examiner—Karin L. Tyson
Attorney, Agent, or Firm—Markell Seitzman

[57] ABSTRACT

An apparatus (20) for safety belts having: a plate member (22) adapted to be mounted relative a cooperating structure, including a top (30) and sidewalls (24, 26) and a bottom (28, 50, 98) situated about an opening (47,47'). A roller is rotated by the shoulder belt (92) and is also supported by a flexible shaft (82) such that during a high level vehicle deceleration the shaft deflects and the roller is permitted to rest upon the bottom of the D-ring.

2 Claims, 2 Drawing Sheets

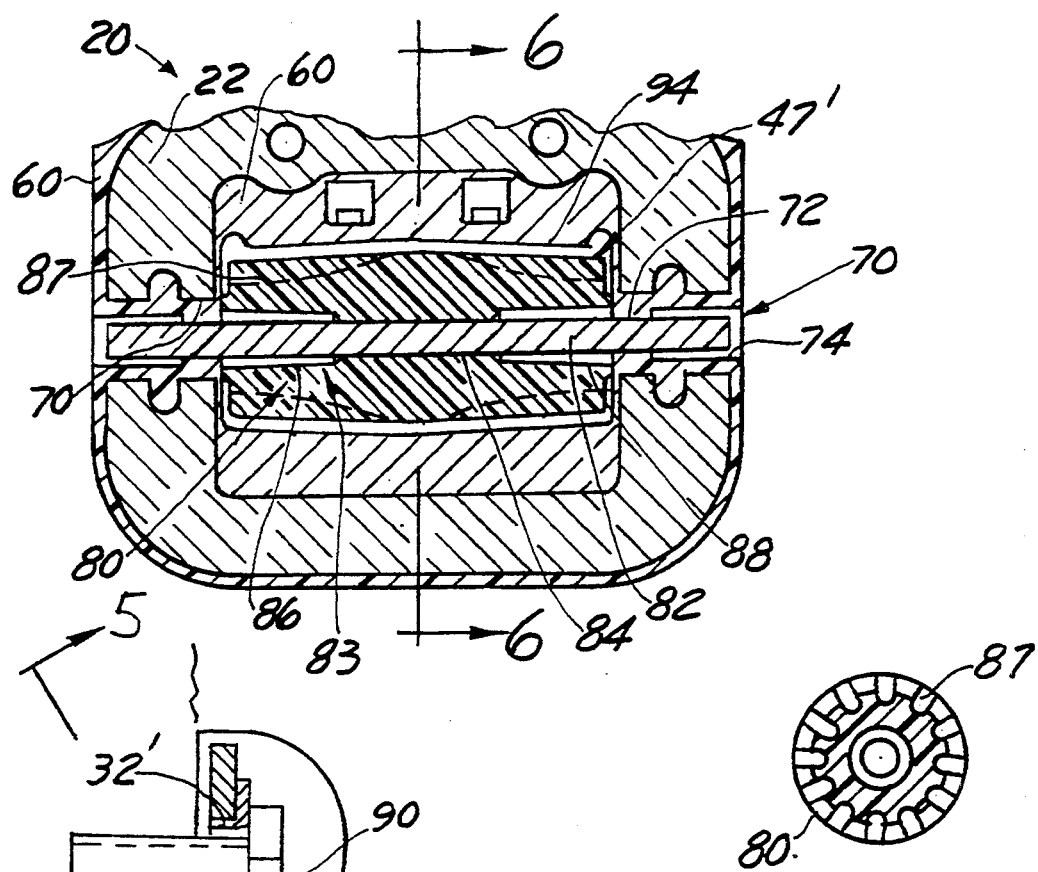
FIG. 5
FIG. 6
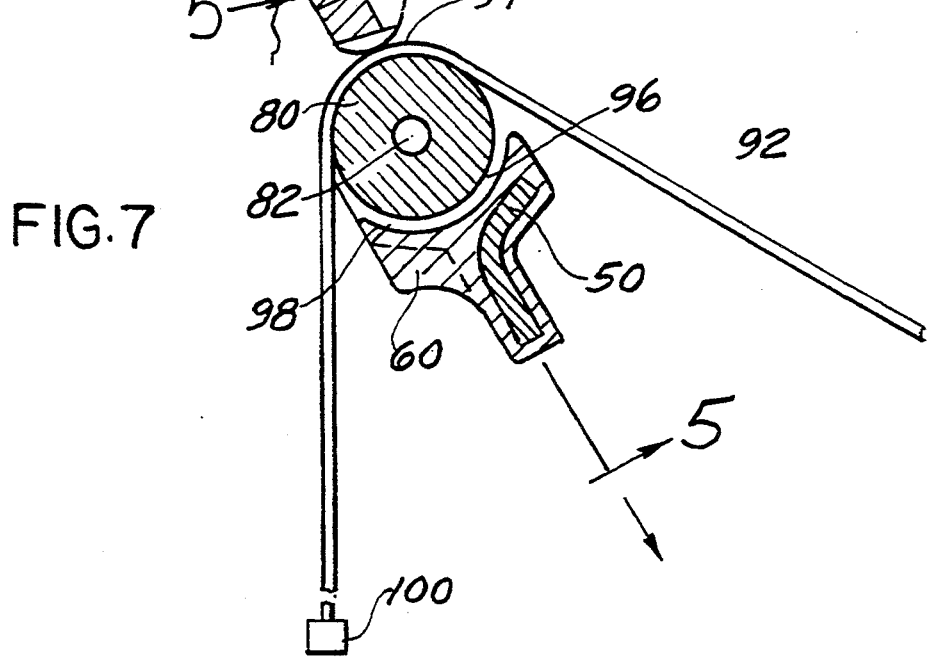
FIG. 7

SEAT BELT ROLLER D-RING

BACKGROUND AND SUMMARY OF THE INVENTION

The present invention relates to an occupant safety restraint seat belt system and more particularly to an improvement in a D-ring for supporting a portion of a safety or seat belt webbing.

A typical seat belt system comprises a retractor upon which seat belt webbing is wound. After exiting the retractor the seat belt webbing is slidable received upon or over a D-ring which is typically attached to the B-pillar of a vehicle by a fastener. The fastener provides a pivot axis about which the D-ring can rotate. As can be appreciated, as the safety belt webbing passes across the D-ring, it generates friction which requires amongst other things, that the rewind spring of the retractor be strong enough to overcome this friction. Various attempts have been made to provide a D-ring that has the necessary load bearing capacity with features that attempt to reduce the webbing retarding frictional force. U.S. Pat. Nos. 4,389,059 and 4,349,217 are illustrative of D-rings which comprise a roller mechanism for reducing retarding frictional forces. Occasionally, as the D-ring is rotated about the axis of its fastening bolt, the webbing may slide or bunch up within a corner of a slot in the D-ring. As can be appreciated, this bunching makes it more difficult or impossible to retract the webbing as the webbing may become caught in this slot.

It is the object present invention to provide a D-ring characterized by a low frictional retarding force and one that is less susceptible to web bunching while providing greater comfort to the belt wearer.

Accordingly, the invention comprises: a D-ring for a safety belt comprising: a plate member adapted to be mounted relative a cooperating structure. The member includes a top and sidewalls and bottom defining an opening. A roller is supported on a flexible shaft and the shaft is supported in bearings located in the member. The shaft deflects in response to high belt forces permitting the roller to move into contact with a mechanical stop provided by the bottom of the plate. In this manner the shaft and its bearings need not absorb the web load and are designed primarily to significantly reduce belt friction.

Many other objects and purposes of the invention will be clear from the following detailed description of the drawings.

BRIEF DESCRIPTION OF THE DRAWINGS

In the drawings:

FIG. 5 shows another partial cross-sectional view of a D-ring.

FIG. 6 shows a cross-sectional view of a roller.

FIG. 7 is an additional cross-sectional view of the D-ring.

DETAILED DESCRIPTION OF THE DRAWINGS

Figure 1:
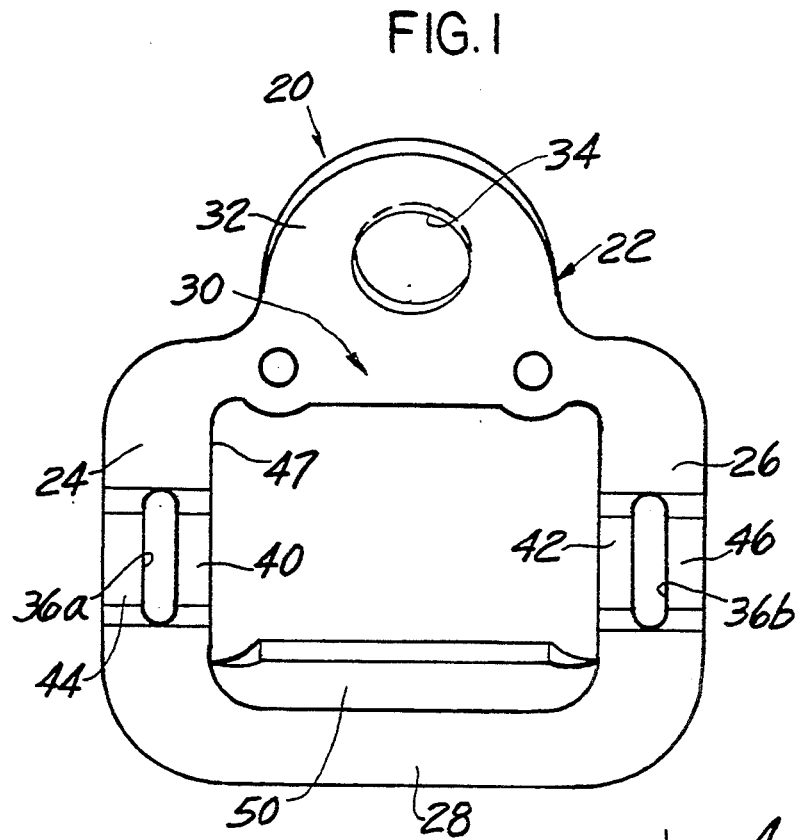
FIGS. 1 and 2 illustrates views of a structural plate which is part of the present invention.
Figure 2:
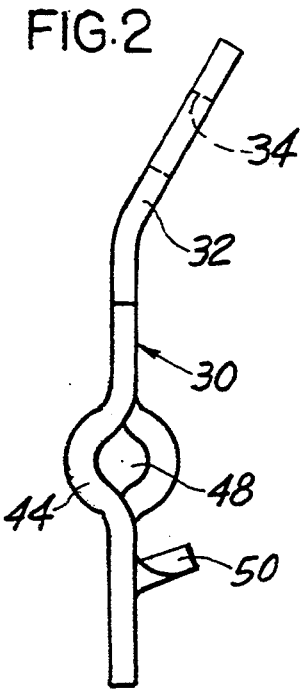
Figure 3:
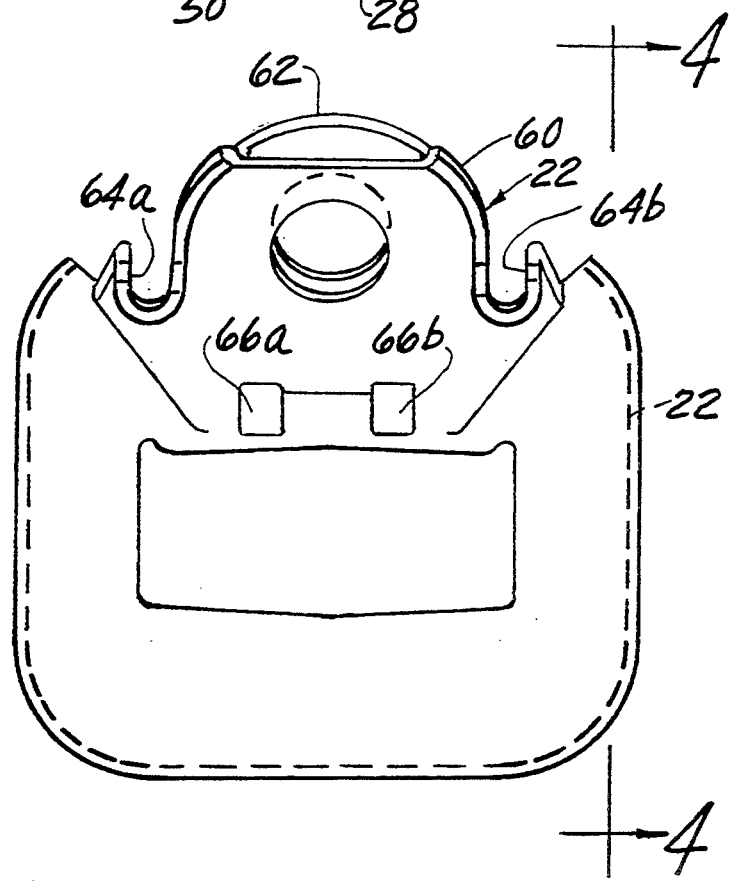
FIG. 3 shows an isometric view of a encased coated plate.

The various FIGURES illustrate a D-ring 20. FIG. 1 illustrates a metal load bearing plate or support member generally shown as 22. The member includes side portions 24 and 26 and a bottom 28. The support member 22 additionally includes a top portion 30 which is bent upwardly relative to a plane extending through the side portions 24 and 26. The top 30 includes a circular shaped element 32 having an opening 34 therein for receipt of a fastener 90 shown in FIG. 7. As can be seen in FIG. 1 each side 24 and 26 includes a stress relief opening 36a or 36b respectively. The material forming each side 24 and 26, on the inside of the opening 36a and 36b, is bent upwardly at 40 and 42. Similarly, the material on the outside of each respective opening is bent downwardly at 44 and 46. As can be seen from the side plan view of the plate 22 in FIG. 2, the bent portions 40 and 44, when viewed from the side, form a generally circular shaped opening or passage 48. A similar opening is formed in relation to the side portions 42 and 46. The bottom 28 of the support member 22 includes an upwardly bent load absorbing flange 50, the purpose of which will be clear from the description below. The plate 22, shown in FIGS. 1 and 2, is provided with an injection molded sheath or cover 60 shown in FIG. 3. The sheath 60, which is typically plastic, covers generally the entire plate with the exception of the very top portion 62 of member 32. By leaving a portion of the plate 22 exposed provides an easy way to ensure, such as during inspection of the part, that the metal plate 22 is in fact underneath the coating or sheath 60. The sheath or coating 60 is formed with a plurality of ears or grooves 64a and 64b as well as with a plurality through holes 66a and 66b which are designed to receive a cover, shown is dotted line in FIG. 7, which is snap fit to the D-ring 20 about the fastener 90. The sheath 60 also extends about opening 47 in the plate 22 slightly reducing its size. The reduced size opening, generally shown as 47', is shown in FIG. 3.

Figure 4:
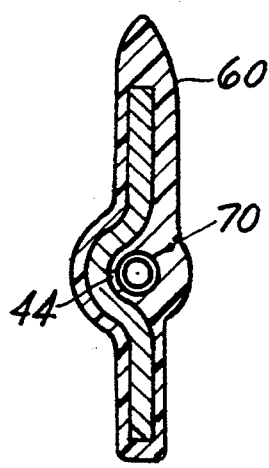
FIG. 4 shows a partial cross-sectional view of a D-ring.

During the molding of the sheath upon the plate 22, pins of the molding machine, are inserted within the openings or passages 48. After the sheath 60 is molded or encased about plate 22 and after the pins are withdrawn a stepped bore, generally shown as 70 is created (see FIG. 5). Each stepped bore 70 preferably comprises a narrow diameter portion 72 and a larger diameter portion 74. As will be seen from the description below, the narrower diameter portion 72 provides a bearing or bushing surface on which a shaft is supported and rotates. FIG. 4 is a cross-sectional view showing the bore 70.

Reference is again made to FIG. 5 which illustrates a cross-sectional view taken through section lines 5—5 of FIG. 7 through the sides 24 and 26 and bottom 28 of the plate 22. Visible in this FIG. 5, is a portion of the sheath 60 and a roller 80 that is supported on a flexible shaft 82 which is supported on the bearings or bushings 72. As can be seen, the diameter of the shaft 82 is preferably smaller than the diameter of the roller 80. The benefit of using this narrow diameter shaft is a reduction in rotational friction.

The roller 80 includes a stepped bore 83. The shaft 82 is pressed fit within a narrow portion 84 of this stepped bore. The outer portions 86 and 88 of the bore 83 have a diameter larger than that of the center or narrow portion 84. The diameter of portions 86 and 88 may be constant or slightly tapered outwardly as illustrated in FIG. 5. As mentioned above, the shaft 82 is pressed fit within the center portion 84 of the stepped bore 84 enabling the roller 80 and shaft 82 to rotate together in the bearings 83. It should be apparent from the above that other embodiments of the invention would permit the roller 80 to rotate upon the shaft 84 with the ends of the shaft either rotationally supported in the bearing 72 or fixed to the plate 22 at the location of the bearings.

Reference is briefly made to FIG. 6 which illustrates an isolated cross-sectional view of the roller 80 generally taken through section 6—6 of FIG. 5. As can be seen, the circumference of the roller includes a plurality of tapered slots 87. As can be seen from FIG. 5, the depth of the slots increase when moving from the center of the roller to its ends. These slots slightly increase the friction coefficient between a portion of the safety belt webbing and the roller. This friction force encourages the roller to roll. In addition, these slots 87 increase the side-to-side frictional coefficient across the roller 80 which prevents the seat belt webbing from sliding to the right or to the left upon roller. This sliding over time, may cause seat belt webbing to bunch up and get caught between the roller and the closely positioned sheath 60.

Reference is now made to FIG. 7 which illustrates another cross-sectional view of the D-ring 20. Shown in FIG. 7 is the fastener 90 inserted within the opening 32' formed in the sheath 60. As can be seen, a portion of the sheath also provides a bearing or bushing surface facilitating the rotation of the D-ring about the fastener 90. FIG. 7 also illustrates a shoulder belt portion of the seat belt webbing which is threaded through a space or slot 94 between the roller 80 and sheath 60.

In operation, that is when an occupant of the vehicle moves within the passenger compartment the shoulder belt will normally be extended and retracted. As the shoulder belt moves it causes the roller 80 and shaft 82 to rotate within the bearings 72. As can be appreciated since the shoulder belt does not slide across a mating part such as the roller the frictional forces generated are reduced. The use of a reduced diameter shaft further reduces the frictional forces generated. The obvious benefit of this is that the spring constant of any return or rewind spring in a cooperating retractor 100 can be reduced. The benefit of using a reduced spring constant is that the forces imparted by the seat belt on the occupant are also lessened making the shoulder belt more comfortable.

When the vehicle is briskly decelerated, and if the retractor locks-up, a downward pulling force, generally shown as 96, is created as the occupant tends to move relative to the D-ring. The downward force 96 of the webbing on the roller 80 might cause the flexible shaft 82 to bend slightly. However, during a very high deceleration situation such as a crash, the shaft 82 will bend sufficiently so that the roller 80 moves and rests upon the sheath 60 at a location generally shown as 96. That portion of the sheath 60 which receives the roller 80 is cylindrically shaped at 98 to more effectively distribute the forces imparted by the roller upon the sheath. As can be appreciated, the thin flexible shaft 82, is not sized to resist the webbing forces, as is characteristic of the prior art, but is chosen to have a reduced diameter to reduce frictional forces in its corresponding bearings 70. When the roller impacts the sheath such as during a severe deceleration of the vehicle, the reaction forces are absorbed by the flange 50 formed within the metal plate 22 of the D-ring 20. As can be seen from FIG. 5 the resultant force vector 96 resulting from the belt forces will generally be directed as shown. The deflection of the roller will generally follow this vector. While it is difficult to predict the exact direction of this vector the curved portion 98 of the sheath is extended upwardly sufficiently to provide a cradle to stop the roller's movement over its expected range of motion.

Many changes and modifications in the above described embodiment of the invention can, of course, be carried out without departing from the scope thereof. Accordingly, that scope is intended to be limited only by the scope of the appended claims.

What is claimed is:

1. An apparatus for safety belts comprising:
a member adapted to be mounted to a cooperating structure, the member defining an opening and including a top and sidewalls extending therefrom;.
roller means for supporting a portion of a safety belt webbing Comprising a roller located generally in the opening, a flexible shaft supporting the roller and support means for supporting ends of a shaft, wherein the roller includes bore for receiving the shaft, the bore being shaped to provide a space to accommodate ends of the shaft as they flex in response to forces imparted to the roller, the shaft being press fit to the roller proximate a center of the bore.

2. The apparatus as defined in Claim 1 wherein the member includes a bottom situated below the roller to provide a mechanical stop or support to limit the deflection of the roller and hence the movement of the shaft when stressed by the safety belt webbing.

* * * * *